United States Patent
Vitsnudel et al.

(10) Patent No.: US 8,126,284 B2
(45) Date of Patent: Feb. 28, 2012

(54) METHOD AND APPARATUS FOR RESOLUTION IMPROVEMENT IN DIGITAL CAPTURING

(75) Inventors: Ilia Vitsnudel, Even Yeuda (IL); Elizaveta Potikha, Netanya (IL); Noam Sorek, Zichron Yaakov (IL)

(73) Assignee: Broadcom Corporation, Irvine, CA (US)

( * ) Notice: Subject to any disclaimer, the term of this patent is extended or adjusted under 35 U.S.C. 154(b) by 1120 days.

(21) Appl. No.: 11/949,212

(22) Filed: Dec. 3, 2007

(65) Prior Publication Data
US 2008/0131022 A1    Jun. 5, 2008

Related U.S. Application Data

(60) Provisional application No. 60/861,970, filed on Dec. 1, 2006.

(51) Int. Cl.
  *G06K 9/48* (2006.01)
  *G06K 9/40* (2006.01)
  *H04N 9/73* (2006.01)
(52) U.S. Cl. ............... 382/254; 382/199; 348/223.1
(58) Field of Classification Search .......... 382/162, 382/167, 199, 254, 266; 348/234, 222.1, 348/223.1, 235, 252, 266, 289, 625, 627, 348/631, 663, 712, 612, 675, 703, 224.1
See application file for complete search history.

(56) References Cited

U.S. PATENT DOCUMENTS

| | | | | |
|---|---|---|---|---|
| 5,170,247 | A | * | 12/1992 | Takagi et al. ............ 348/655 |
| 5,953,058 | A | * | 9/1999 | Hanagata ............ 348/223.1 |
| 6,151,425 | A | * | 11/2000 | Wakisawa et al. ............ 382/298 |
| 6,573,932 | B1 | * | 6/2003 | Adams et al. ............ 348/224.1 |
| 6,642,962 | B1 | * | 11/2003 | Lin et al. ............ 348/252 |
| 6,816,193 | B1 | * | 11/2004 | Kohashi et al. ............ 348/234 |
| 6,850,275 | B1 | * | 2/2005 | Minakami ............ 348/252 |
| 6,876,763 | B2 | * | 4/2005 | Sorek et al. ............ 382/162 |
| 7,102,680 | B2 | * | 9/2006 | Mori et al. ............ 348/314 |
| 7,262,793 | B2 | * | 8/2007 | Nakajima et al. ............ 348/220.1 |
| 7,474,342 | B2 | * | 1/2009 | Kohashi et al. ............ 348/234 |
| 2004/0036898 | A1 | * | 2/2004 | Takahashi ............ 358/1.9 |

* cited by examiner

*Primary Examiner* — Andrae S Allison
(74) *Attorney, Agent, or Firm* — Brinks Hofer Gilson & Lione

(57) ABSTRACT

A method and apparatus for enhancing the resolution of digital images. For each image a white balanced image is generated, which takes into account the differences in the colors of the sensor cell upon which the values are generated. Edge detection filters are then activated on the white balanced image and a weight is determined, indicating the probability that a feature which was detected as an edge is indeed an edge. At the last step, each detected edge is multiplied by the probability and is added to the luminance component, thus enhancing the edges. Preferred embodiments of the white balance image generation. Generating the white balanced image, detecting the edges and determining the weights are disclosed for sensors operating in Line Addition On mode and for sensors operating in Line Addition Off mode.

20 Claims, 4 Drawing Sheets

TABLE 1

| Cy | Ye | Cy | Ye |
|----|----|----|----|
| Mg | Cy | Mg | G  |
| Cy | Ye | Cy | Ye |
| G  | Mg | G  | Mg |

TABLE 2

| Cy+Mg | Yl+G  | Cy+Mg | Yl+G  |
| Cy+G  | Yl+Mg | Cy+G  | Yl+Mg |
| Cy+Mg | Yl+G  | Cy+Mg | Yl+G  |
| Cy+G  | Yl+Mg | Cy+G  | Yl+Mg |

TABLE 3

| β | α | β | α |
| δ | γ | δ | γ |
| β | α | β | α |
| δ | γ | δ | γ |

FIG. 3

TABLE 5

| G+B | G+R | G+B | G+R |
|---|---|---|---|
| B+R | G | B+R | G |
| G+B⁰ | G+R¹ | G+B | G+R |
| G² | B+R³ | G | B+R |
| G+B⁴ | G+R⁵ | G+B | G+R |
| B+R⁶ | G⁷ | B+R | G |
| G+B | G+R¹ | G+B | G+R |
| G | B+R | G | B+R |

(Table 5 referenced as 420, with cells 422, 424, 428, 430, 432, 434, 436, 438, 440, 442, 444, 448)

TABLE 4

| Cy | Ye | Cy | Ye |
|---|---|---|---|
| Mg | G | Mg | G |
| Cy | Ye | Cy | Ye |
| G | Mg | G | Mg |
| Cy | Ye | Cy | Ye |
| Mg | G | Mg | G |
| Cy | Ye | Cy | Ye |
| G | Mg | G | Mg |

(Table 4 referenced as 400)

FIG. 4

METHOD AND APPARATUS FOR RESOLUTION IMPROVEMENT IN DIGITAL CAPTURING

RELATED APPLICATIONS

The present application claims priority under 35 U.S.C. §119(e) of U.S. provisional patent application No. 60/861,970, filed Dec. 1, 2006, the disclosure of which, in its entirety, is incorporated herein by reference.

TECHNICAL FIELD

The present invention relates to the field of electronic imaging in general, and to an apparatus and method for improving the resolution of digital images, in particular.

BACKGROUND

A basic concept in imaging in general, and digital imaging in particular is the resolution, i.e., the ability to distinguish small details in a captured image. Resolution can relate to horizontal details, vertical details or both. The resolution primarily depends on the number of sensor cells in the sensor of a digital camera, and on the number of picture elements pixels) in the resulting image.

An important aspect of resolution is edge detection and enhancements. If edges are detected they can be enhanced and viewed more clearly, thus increasing resolution. Consider for example FIG. 1A and FIG. 1B. In FIG. 1A, the lines blur at about 500 lines per image, wherein in FIG. 1B, which presents higher resolution, the lines blur at almost 600 lines per image.

Color video sensors usually comprise pairs of quadruples of cells, each quadruple comprising a cyan cell, a yellow cell, a magenta cell and a green cell, arranged as a 2×2 matrix, wherein the order of the green cell and magenta cell changes between neighboring quadruples. Sensors may use one of two operation modes, being Line Addition Mode on, and Line Addition Off mode. In Line Addition On mode, which is more commonly used since it provides wide dynamic intensity range, every pixel in every line in one of the output fields of the resulting image is a sum of two vertically adjacent pixels in the sensor, so access to the direct value of each sensor cell is disabled. In Line Addition Off mode, the row value of each sensor cell is available. The intensity values of the sensor cells, which carry the edge information, are output to a display device as Y component, also known as the luminance component, and the color information is output as a chrominance channel. The Y component is determined by averaging neighboring sensor cell values, activating edge detection filters on the resulting values and adding the edge information to the values. The resulting values thus present bold edges, but often conceal smaller ones, mainly due to the averaging of values and generating a single pixel out of every four sensor cell values.

There is thus a need in the art for a method for deriving small or subtle edges, both in devices working using the Line Addition On mode and in devices using the Line Addition Off mode. The method and apparatus should be performed in real time environment, so as to enable enhanced resolution video images.

SUMMARY

A method and apparatus for enhancing the resolution of a sensor used in digital imaging. The method and apparatus are implemented for sensors working in Line Addition On mode and in Line Addition Off mode. In Line Addition On mode only the vertical resolution is improved, while in Line Addition Off mode the horizontal as well as the vertical resolutions are improved An aspect of an embodiment of the invention relates to a method for enhancing the resolution of a digital image captured by a capturing device comprising a sensor, the method comprising the steps of: receiving the digital image from the sensor; generating a white balanced image from the digital image; detecting one or more edges on the white balanced image; and determining a weight for each of the edges. The method optionally comprises the step of adding to a luminance component generated from the digital image a sum of products, wherein each product is a multiplication of an edge and its weight. Within the method, the sensor optionally operates in Line Addition On mode. Within the method, the white balanced image is optionally generated by multiplying all sensor values of a predetermine color in a constant number so as to obtain uniform values for mosaic cells of different types in areas capturing a grayscale image. Within the method, the weight for each edge is optionally determined according to one or more parameters from the group consisting of: a weight indicating if a significant color pattern is present; the presence of additional edges in the vicinity of the at least one edge; the difference between vertical neighboring cells in the white balanced image; the absence or presence of horizontal edges; and local illumination range intensity. The weight is optionally determined as the minimum of all parameters. Within the method, the sensor optionally operates in Line Addition Off mode. Within the method, the white balanced image is optionally generated by multiplying all sensor values of a predetermine color in a constant number so as to obtain uniform values for mosaic cells of different types in areas capturing a uniform color. Within the method, substantially all pixels in the white balanced image are generated by performing mathematical operations, each operation performed on cells belonging to a single row of the digital image. Optionally the value of green cells is multiplied by a predetermined factor, and the value of each cell is incremented in the average value of its horizontal neighboring cells. Optionally, any of the edges is a horizontal edge, and substantially all pixels in the white balanced image are generated by performing mathematical operations wherein each operation is performed on pixels belonging to a single column of the digital image. Within the method, optionally the value of green cells is multiplied by a predetermined factor, and the value of each cell is either incremented by the average value of its vertical non-immediate neighboring cells or is assigned the average value of its two vertical immediate neighboring cells. Optionally, any of the edges is a vertical edge. Within the method, the weight is optionally used for eliminating false edges. The weight is optionally determined by analyzing vertical and horizontal edges strength on a luminance component of the digital image. The sensor is optionally a CCD sensor or a CMOS sensor.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which:

FIG. 3 shows tables for demonstrating the Line Addition On mode; and

FIG. 4 shows tables for demonstrating determination of the white balanced image in Line Addition Off mode, in accordance with the disclosure.

DETAILED DESCRIPTION

Digital imaging generally uses an array of sensors, such as CCD or CMOS sensors, preferably arranged in a matrix-like structure comprising rows and columns. In color imaging, the cells are preferably arranged in pairs of 2×2 matrices, comprising cyan and yellow cells on one row, and magenta and green cells on the next row, wherein the order of the magenta and green cells switches between two neighboring quadruples. The disclosed method and apparatus provide for enhanced resolution. First a white balanced image is generated, which takes into account the differences in the colors of the sensor cell upon which the values are generated. Thus, the white balance image comprises uniform values for mosaic cells of different types in sensor areas capturing a grayscale image in Line Addition Mode on method, and uniform values for mosaic cells of different types in sensor areas capturing a uniform color image in Line Addition Mode off.

Then, edge detection filters are activated on the white balanced image. On the next step, a weight is determined, indicating the probability that a feature which was detected as an edge is indeed an edge. Then, at the last step, each detected edge is multiplied by the probability, and the sum of all products is added to the luminance component, thus enhancing the edges. Preferred embodiments of the white balance image generation, the edge detection, and the edge weight determination are provided separately for sensors working in Line Addition On mode and for sensors working in Line Addition Off mode.

Figure 1A:
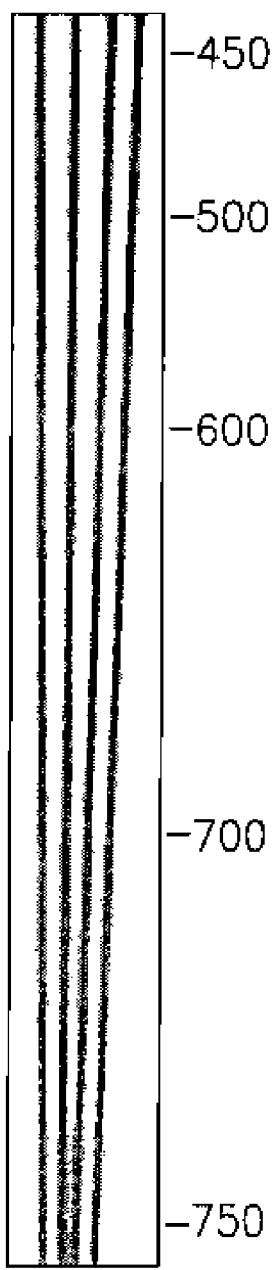
FIG. 1A and FIG. 1B show an exemplary demonstration of resolution differences.
Figure 1B:
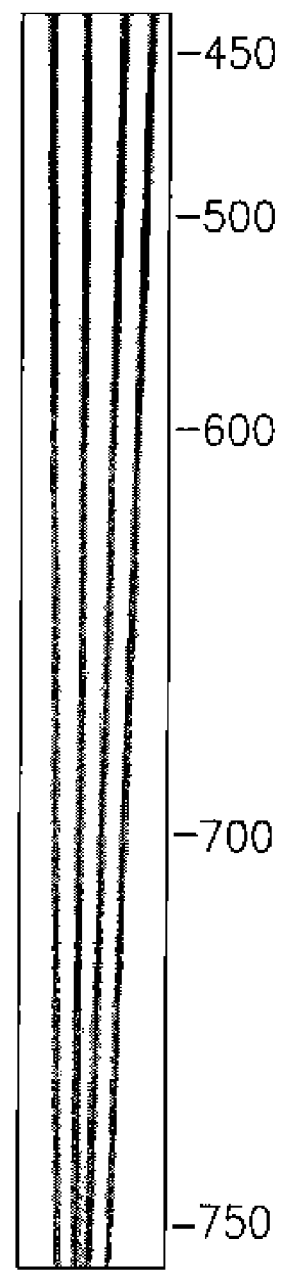
Figure 2:
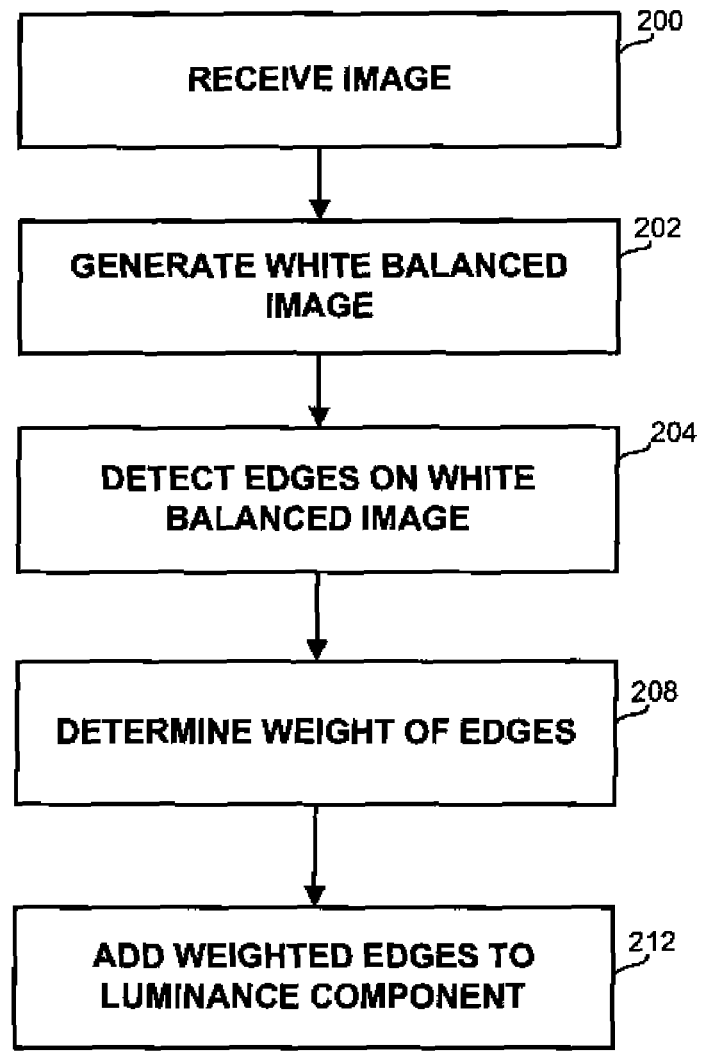
FIG. 2 shows a flowchart of the main steps in a method for enhancing resolution, in accordance with the disclosure.

Referring now to FIG. 2, showing a flowchart of the main steps in a method for enhancing resolution, in accordance with the disclosure.

On step 200 a digital image is received. The image is received according to the used equipment, either as cell values associated wherein each cell is associated with a particular color as in Line Addition Off mode, or as sums of two sensor cell values as received from a sensor using Line Addition On mode. On step 202, a white balance image is generated from the digital image. The white balance image represents the uncolored version of the image, wherein the luminance value of each pixel is determined according to a ratio between the value of the cell or the cell combination and surrounding cell values, or global ratios as determined for a particular sensor and light conditions.

On step 204, edges are detected on the gray-scale image generated on step 202. As detailed further below, if the sensor operated in Line Addition On mode, only vertical edges can be detected, while in Line Addition Off mode both horizontal and vertical edges are detected. Each edge is represented as a collection of pixels, which are adjacent, diagonal or otherwise close to one another. On step 208 an edge weight is determined for each pixel, according to a number of factors detailed below. On step 212, the luminance component of each pixel is updated by addition of the edge weight associated with the respective pixel if the particular pixel is included in a detected edge. Thus, the weight, indicating also the authenticity of the edge is used for eliminating false edges.

It will be appreciated by a person skilled in the art that when a horizontal vector (also termed convolution filter) X is applied to a matrix A, it is meant that the resulting matrix is a convolution of the matrix A with the horizontal filter X. When a vertical vector, typically indicated with a prime sign, such as X', is applied to a matrix A, the resulting matrix is a convolution of the matrix A with the vertical filter X'.

Line Addition On Mode

In Line Addition On mode, the values of horizontally neighboring sensor cells are summed and there is no access to the raw values of the sensor cells. Therefore, single-pixel horizontal resolution (i.e. resolution between lines) is damaged, and the disclosure suggests improving the vertical resolution, i.e. the ability to distinguish vertical lines. In order to distinguish vertical lines, it is required to locate a vertical series of horizontally neighboring cells in the resulting matrix, that have significantly different values, for example a column of pairs of cells, wherein in all pairs the left cell has a value significantly smaller than the value of the right cell.

Referring now to FIG. 3, showing the general scheme of using Line Addition On mode, in interleaved broadcasting. Table 1 (300) shows four CCD mosaics, each mosaic comprising cyan, yellow, magenta and green sensors. Table 2 (310) shows the added lines of table 1 (300), wherein line 1 (312) which is the summation of lines 302 and 304 is the first line in the first transmitted field, line 2 (314) which is a summation of lines 306 and 308 is the second line in the first transmitted field, and similarly line 3 (316) and line 4 (318) which are the summation of the next two pairs of lines, are the third and fourth lines in the first field. The values of table 2 (310) are indicated in table 3 (320) as $\alpha$, $\gamma$, and $\delta$. Second field will look similarly and its first line will be a summation of lines 304 and 306. In Table 2 and further on we are looking on a single field as all operations are the same for both fields.

Generating the White Balanced Image

The following section details step 202 of FIG. 2 above, of generating the White Balanced Image for the case a Line Addition Mode on is used. In one preferred embodiment, the white balanced image is determined as follows: each color is characterized by a constant ratio between any two of $\alpha$, $\beta$, $\gamma$, and $\delta$, for example $\beta/\alpha$. Thus, a white or any other color on the gray scale is characterized by constant ratios between $\alpha$, $\beta$, $\gamma$, and $\delta$. These ratios depend on the sensor and the illumination, since a white object under daylight looks different then the same object under artificial illumination. Thus, in order to generate a monochromatic picture, the ratios are determined. Then, a specific entry is chosen as a scaling factor, for a non-limiting example $\beta$, but other scaling factors derived from other entries or combination thereof, can be applied as well. Then each entry in table 3 (320) is scaled by the ratio between $\beta$ and the respective color as determined for white color. Thus, the value of each $\alpha$ cell is multiplied by $(\beta'/\alpha')$, wherein $\beta'/\alpha'$ is the ratio between $\beta$ and $\alpha$ in the white color. Similarly, each $\gamma$ cell multiplied by $(\beta'/\gamma')$ wherein $\beta'/\gamma'$ is the ratio between $\beta$ and $\gamma$ in the white color, and each $\delta$ cell is set to be $\delta*(\beta'/\delta')$, wherein $\beta'/\delta'$ is the ratio between $\beta$ and $\delta$ in the white color. After all multiplications are done, the resulting image is a monochromatic image, on which edge detection can be performed.

In another preferred embodiment, in order to generate a monochromatic picture, for each region such as columns 322 and 324 of table 3 (320), the average value of each of $\alpha$, $\beta$, $\gamma$, and $\delta$ is determined. Then, a specific entry is chosen as a scaling factor, for a non-limiting example $\beta$. Then each entry in table 3 (320) is scaled according to the ratio between the average value of the respective entry and the average value of the scaling factor. Thus, the value of each α cell is multiplied by (β'/α'), wherein β' is the average value of β cells in the region, and α' is the average value of α cells in the region. Similarly, each γ cell multiplied by (β'/γ') and each δ cell is set to be δ*(β'/δ'), wherein γ' is the average of γ cell values in the region and δ' is the average of δ cell values in the region. After all multiplications are done, the resulting image is a monochromatic image, on which edge detection can be performed. The constant factor by which the values are scales are preferably determined for areas having a significantly uniform color, determined for example by testing the differences between values of cells of the same type, every predetermined number of cells. In yet another preferred embodiment, the multiplication is done column-wise, thus each α cell is multiplied by (β'/α'), each γ cell multiplied by (δ'/γ') while the β and δ cells are left as is.

However, for some colors such as yellow or cyan the abovementioned ratios make the cell matrix seem like it is made of horizontal or vertical stripes, which may be wrongly interpreted like edges. Therefore, after edges are found in the image, it is required to further distinguish between real edges and edge-like combinations.

Edge Detection

The following section details step 204 of FIG. 2 above, of detecting edges on the White Balanced Image, for the case a Line Addition mode on is used. In this mode, since horizontal resolution is damaged due to the addition of horizontal lines, only vertical edges are detected. The edges can, according to a preferred non-limiting example, be detected by operating a filter of [1 2 1]'*[−1 2 −1]/2 on the white balanced image. Then, small edges, i.e. edges in which the difference between neighboring cells is below a predetermined threshold are optionally ignored.

Determining Edge Weights

The following section details step 206 of FIG. 2 above, of Determining Edge Weights, for the case a Line Addition On mode is used. The weight of each edge is optionally determined to be the minimum of several weights:

A. Non-color weight: a consistent or significant color pattern indicates that what was detected as an edge is not an edge but rather a color combination that seems like an edge. In order to detect such cases, the white balanced image is first filtered to locate a vertical pattern, for example with a filter of [−1 2 −1]', then the result is filtered with a horizontal pattern such as [1 −2 2 −2 1], and the resulting matrix is blurred with a [1 1 1] filter. The resulting matrix comprises zero or very low values for those areas in which the detected edges are not edges but rather specific colors.

B. Y-edge-vicinity weight: edges will only be added if edges were also detected in their vicinity on the luminance (Y) component. In order to detect edges on the Y component, the Y component matrix is for example filtered with a [−1 1]' and [0.5 1. 0.5]', then blurred with a [1 1 1 1 1] filter, and then a median filter is applied, for example on the neighborhood of 5 horizontal neighboring pixels around each pixel.

For weights C and D detailed below, a vertical difference variable is determined as follows: for each pixel in the White Balanced image, it is determined how much its value differs from it's average vertical neighbor, and the differences matrix is integrated over horizontal pixels using the weight vector of [1 2 2 2 1].

C. Is-gray weight: edges will be added only on the gray color. Thus, if the vertical difference is lower than a predetermined threshold, meaning that the value of the pixel is similar to the value of its neighbors, it can be considered as an edge, otherwise it is not. Then, the White Image will be blurred, for example horizontally by filtering with a [1 2 2 2 1] filter, and vertically by using a [1 1]' vector.

D. Non-horizontal-edge weight: an edge will be added only if there are no horizontal edges. The Not-horizontal-edge weight is optionally determined by blurring the vertical differences with a [1 1 1 1 1 1 1] filter, and then applying a median filter [3 1].

E. Y-Intensity weight: an edge will be added only if the intensity of the image is within some predetermined interval, in order to avoid adding artifacts on the very dark and very bright areas, which may be caused by saturated cells or by very low intensity values.

For each value of A, B C D or E above, a predefined piecewise linear look up table will determine the corresponding actual weight for any specific value. For example, for weight of type A, the look up table will assign maximal weight to small values of A, a zero weight for large values and linearly decreasing weights for the intermediate values.

Then, the edge weight is determined to be the minimum of Non-color weight, Y-edge-vicinity weight, Is-gray weight, Non-horizontal-edge weight and Y-Intensity weight. It will be appreciated that the total weight can be determined in other ways then the minimal of the abovementioned weights, such as a weighted sum of the abovementioned factors, or a weighted sum if all factors yield a positive result and zero otherwise, or any other combination. It will be further appreciated that less, more, or different weights can be designed and use in order to distinguish high-resolution edges.

Then, the edge multiplied by the respective weight for each pixel is added to the Y component. Thus, Y:=Y+HiResEdge*Edge_Weight+regular edges, wherein HiResEdge indicates the intensity of the edge at the particular pixel, determined, for example, as described in the "Edge detection" section above, and wherein the regular edges are the edges as determined on the Y component. Thus, the addition of HiResEdge*Edge_Weight enhances the edges determined on the Y component and does not replace them.

Line Addition Off Mode

In Line Addition Off mode, the values of all sensor cells are transferred as is, and no summation is performed. Thus, this mode provides the ability to improve the horizontal resolution and to utilize a more robust algorithm for improving the vertical resolution.

When implementing Line Addition Off mode, the original values of the sensor cells, i.e. the mosaics image for which the Line Addition Node is designed, as opposed to the added values, are obtained. For example Wide Dynamic Range charge couple device (CCD) signals for each field of the two fields constituting a video image are optionally implemented as follows: at the first step, a signal is generated which moves all the charges of the odd sensor cells to the CDS (odd XSG). Then, a signal is generated that moves all the charges of the even CCD cells to the CDS (even XSG), and consequently all the charges are moved down using multiple XV signals, to generate one line after the other.

Referring now to FIG. 4, in which table 4 (400) and table 5 (420) demonstrate the basic colors obtained by the sensor cells, since cyan is a combination of blue and green, magenta is a combination of blue and red, and yellow is a combination of green and red.

Generating the White Balanced Image

The following section details step 202 of FIG. 2 above, of generating the White Balanced Image for the case a Line Addition Off mode is used. In Line Addition Off mode, the white balanced image is determined by using local relations between neighboring sensor cells for each pixel. Determining the white balanced image is based on the following: if there is a vertical (or horizontal) edge, then vertically (or horizontally, respectively) neighboring pixels are different only because they are of different mosaic type and not because of the edge. Thus, it is required to find the same mosaic combination for neighboring pixels, upon which edges can be detected.

The white balanced image is determined separately for detecting horizontal edges and for detecting vertical edges.

As for horizontal edges, considering horizontally neighboring cells of table 5 (420) shows that there are four sensor types: G+R pixel with G+B on both sides; G+B pixel with G+R on both sides; G pixel with B+R on both sides; and B+R pixel with G on both sides. In all cases, the sum of a particular cell value and the average of its two immediate horizontal neighbors, after multiplying all "G" cells such as cell 422 by 2, yields 2G+R+B. Thus, obtaining the white balanced image requires mathematical and logical operations wherein each operation is performed on cells belonging to the same row. This calculation is performed on cells belonging to a single row, and once performed for substantially all cells provides a monochromatic images, in which the vertical resolution is not affected, and horizontal edges can be detected, by detecting two adjacent rows having values differing beyond a predetermined threshold. The combination of 2G+R+B should be slightly enhanced, since the electronic charge of a "G" sensor, such as cell 422 is almost the same as the electronic charge of a "G+R" sensor, such as cell 424, or a "G+B" sensor. Thus, the "G" cells should be multiplied by a constant which is between 1 and 2, and is predetermined for each specific sensor type.

As for vertical edges, considering vertically neighboring cells of table 5 (420) shows that there are eight different combinations of a sensor type and four vertically neighboring sensors, as indicated by superscripts cells 428, 430, 432, 434, 436, 438, 440 and 442. The cells of type "G" are first multiplied by a factor between 1 and two as detailed above. Then, for cells of types 0, 1, 4 and 5, i.e. cells 428, 430, 436 and 438, the average value of the immediate vertical neighboring cells, i.e. the cells immediately above and below the cell accumulates to 2G+R+B. For cells of types 2, 3, 6 and 7, i.e. cells 432, 434, 440 and 442 the sum of the cell itself and the average between the cells which are its non-immediate neighbors, i.e. two cells above or below the particular cell, for example, the value of cell 440 is the sum of its original value and the average of cells 448 and 432, which accumulates also to 2G+R+B. Once all the sums are determined, vertical edges can be detected on the image. In the disclosed embodiment, obtaining the white balanced image requires mathematical and logical operations wherein each operation involves only cells belonging to the same column.

Edge Detection

The following section details step 204 of FIG. 2 above, of detecting edges on the White Balanced Image, for the case a Line Addition Mode off is used. In this mode, horizontal edges are detected using the [−1 2 −1]' filter, and vertical edges are detected using the [−1 2 −1] filter, as applied to the corresponding White Balance Image. Small edges, i.e. edges comprising less than a predetermined number of pixels are ignored.

False vertical edges may be detected at areas where horizontal edges exist, and vice versa. In order to avoid this effect, such edges are disregarded using the edge weights mechanism.

Determining Edge Weights

The following section details step 206 of FIG. 2 above, of Determining Edge Weights, for the case a Line Addition Off mode is used. The edge weight is preferably determined according to the Y component. The Y component matrix is first filtered with [−1 1 0] filter, and with [0 −1 1] filter and the maximal value between these two filters is obtained for each pixel and denoted DV. This operation determines the presence of vertical edges on the Y component at this pixel. The same is repeated for the horizontal edges with a [−1 1 0]' filter and with [0 −1 1]' filter, and is denoted DH. Then, for each cell, if DH is higher than DV is set to zero, and vice versa. This operation selects for each pixel whether it is a part of a vertical edge or of a horizontal edge. A pixel can also not belong to any edge, but no pixel can be a part of a vertical and a horizontal edge at the same time. Then, the resulting weight matrix is blurred with a horizontal filter of [1 1 1] and a vertical filter of [1 1 1]'. In order to avoid additional delays, the vertical filter can be replaced with another filter, such as a [1 1]*3/2 filter. The horizontal edges having a weight below a first predetermined threshold, and vertical edges having a weight below a second predetermined threshold are ignored and their values are set to zero. Then, the total high resolution edge is determined as the sum of the horizontal edge and vertical edge. A linear function of the edge intensity, that may, for example, ignore very small edges and increase other edges may be applied to receive the total high resolution edges. The Y component is then enhanced with the edges similarly to the implementation of step 212 for the case of Line Addition On mode detailed above, in which the weighted edges are added to the Y component.

The disclosed method enables real-time resolution improvement in digital imaging. The method utilizes edge detection techniques, performed on monochromatic images generated from the original images generated by the sensor. The edges are then assigned weights intended to distinguish real edges from false alarms according to various parameters, and the real edges are added to the luminance component of the output image. The generation of the monochromatic image is performed differently for sensors operating in Line Addition On mode and for sensors operating in Line Addition Off mode. In monochromatic images obtained from sensors working in Line Addition On mode vertical edges are detected and enhanced, wherein in monochromatic images obtained from sensors working in Line Addition Off mode vertical edges as well as horizontal edges are detected and enhanced.

It will be appreciated by a person skilled in the art that other methods may be applied to each step in the method, and in particular to the generation of a monochromatic image, to the edge detection and to the edge weight determination. The edge weight determination can use any subset of the shown parameters, a superset containing one or more of the shown parameters, one or more of the shown parameters when implemented in a different way or the like. It will further be appreciated that the mentioned filters are exemplary only, and that other filters can be used to achieve the same objectives as the disclosed filters.

It will be also appreciated by a person skilled in the art that the disclosed method and apparatus can be used upon an image that was captured with any additional mechanism, such as a mechanism for expanding the dynamic range of the sensor, or the like. Further, the disclosed method, and a capturing device operating according to the disclosed method can be used with further methods, steps devices or other components for enhancing the capturing speed, the image quality, the resource requirements or other objectives. Methods and steps disclosed above also disclose apparatus and components for carrying out the methods and steps. The apparatus preferably comprises one or more computing platforms, executing computer instructions implemented as software, firmware, hardware or any other option.

Structure and acts described herein are replaceable by equivalents, which perform the same function, even if the structure or acts are different, as known in the art. Therefore, only the elements and limitations as used in the claims limit the scope of the invention. When used in the following claims, the terms "comprise", "include", "have" and their conjugates mean "including but not limited to".

The invention claimed is:

1. A method for enhancing the resolution of a digital image captured by a capturing device, wherein the capturing device includes a sensor, the method comprising:
receiving the digital image from the sensor;
generating a white balanced image from the digital image;
detecting an at least one edge on the white balanced image; and
determining a weight for each of the at least one edge, wherein the sensor operates in Line Addition Off mode, wherein substantially all pixels in the white balanced image are generated by performing mathematical operations, wherein each operation is performed on cells belonging to a single row of the digital image, and wherein the value of green cells is multiplied by a predetermined factor, and the value of each cell is incremented by the average value of its horizontal neighboring cells.

2. The method of claim 1 wherein the at least one edge is a horizontal edge.

3. The method of claim 1 wherein the weight is used for eliminating false edges.

4. The method of claim 1 wherein the weight is determined by analyzing vertical and horizontal edges strength on a luminance component of the digital image.

5. The method of claim 1 wherein the sensor is a CCD sensor or a CMOS sensor.

6. The method of claim 1 wherein the white balanced image is generated by multiplying all sensor values of a predetermine color in a constant number so as to obtain uniform values for mosaic cells of different types in areas capturing a uniform color.

7. A method for enhancing the resolution of a digital image captured by a capturing device, wherein the capturing device includes a sensor, the method comprising:
receiving the digital image from the sensor;
generating a white balanced image from the digital image;
detecting an at least one edge on the white balanced image; and
determining a weight for each of the at least one edge, wherein the sensor operates in Line Addition Off mode, wherein substantially all pixels in the white balanced image are generated by performing mathematical operations, wherein each operation is performed on pixels belonging to a single column of the digital image, and wherein the value of green cells is multiplied by a predetermined factor, and wherein the value of each cell is either incremented by the average value of its vertical non-immediate neighboring cells or is assigned the average value of its two vertical immediate neighboring cells.

8. The method of claim 7 wherein the at least one edge is a vertical edge.

9. The method of claim 7 wherein the sensor is a CCD sensor or a CMOS sensor.

10. The method of claim 7 wherein the weight is used for eliminating false edges.

11. The method of claim 7 wherein the weight is determined by analyzing vertical and horizontal edges strength on a luminance component of the digital image.

12. The method of claim 7 wherein the white balanced image is generated by multiplying all sensor values of a predetermine color in a constant number so as to obtain uniform values for mosaic cells of different types in areas capturing a uniform color.

13. A method for enhancing the resolution of a digital image captured by a digital camera that includes a sensor, the method comprising:
receiving the digital image from the sensor that includes a CCD sensor or a CMOS sensor;
generating a white balanced image from the digital image;
detecting an at least one edge on the white balanced image; and
determining a weight for each of the at least one edge, wherein the sensor operates in Line Addition Off mode or Line Addition On mode, wherein substantially all pixels in the white balanced image are generated by performing mathematical operations, wherein each operation is performed on pixels belonging to a single column or a single row of the digital image, and wherein the value of green cells is multiplied by a predetermined factor, and wherein the value of each cell is incremented by the average value of its horizontal neighboring cells or its vertical neighboring cells.

14. The method of claim 13 comprising:
adding to a luminance component generated from the digital image a sum of products, wherein each product is a multiplication of the at least one edge and the weight.

15. The method of claim 13 wherein the sensor operates in Line Addition On mode.

16. The method of claim 15 wherein the white balanced image is generated by multiplying all sensor values of a predetermined color in a constant number so as to obtain uniform values for mosaic cells of different types in areas capturing a grayscale image.

17. The method of claim 15 wherein the weight for each of the at least one edge is determined based on at least one parameter based on one or more of the following: a weight indicating if a significant color pattern is present; the presence of additional edges in the vicinity of the at least one edge; the difference between vertical neighboring cells in the white balanced image; the absence or presence of horizontal edges; and local illumination range intensity.

18. The method of claim 17 wherein the weight for each of the at least one edge is determined as the minimum of the at least one parameter.

19. The method of claim 13 wherein the at least one edge comprises a horizontal edge or a vertical edge.

20. The method of claim 13 wherein the weight is used for eliminating false edges.

* * * * *